US007156174B2

(12) United States Patent
Roddy et al.

(10) Patent No.: US 7,156,174 B2
(45) Date of Patent: Jan. 2, 2007

(54) CONTAINED MICRO-PARTICLES FOR USE IN WELL BORE OPERATIONS

(75) Inventors: Craig W. Roddy, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 231 days.

(21) Appl. No.: 10/768,864

(22) Filed: Jan. 30, 2004

(65) Prior Publication Data
US 2005/0167105 A1 Aug. 4, 2005

(51) Int. Cl.
*E21B 33/138* (2006.01)
(52) U.S. Cl. .................. 166/293; 106/802; 106/812; 106/816; 106/819; 166/292; 507/269; 507/906
(58) Field of Classification Search ............ 166/285, 166/292, 293; 106/721, 737, 802, 812, 819, 106/823; 507/269, 902, 906
See application file for complete search history.

(56) References Cited

U.S. PATENT DOCUMENTS

| | | | |
|---|---|---|---|
| 2,238,671 A | 4/1941 | Woodhouse ................ 166/21 |
| 2,703,316 A | 3/1955 | Schneider ................ 260/78.3 |
| 2,805,719 A | 9/1957 | Anderson ................ 166/29 |
| 3,131,075 A | 4/1964 | Brooks, Jr. ................ 106/90 |
| 3,360,046 A | 12/1967 | Johnson ................ 166/29 |
| 3,784,585 A | 1/1974 | Schmitt et al. ................ 260/861 |
| 3,828,854 A | 8/1974 | Templeton et al. ........ 166/307 |
| 3,832,434 A | 8/1974 | Flood et al. ................ 264/117 |
| 3,868,998 A | 3/1975 | Lybarger et al. ............ 166/278 |
| 3,912,692 A | 10/1975 | Casey et al. ........... 260/78.3 R |
| 3,958,638 A | 5/1976 | Johnston .................... 166/294 |
| 3,960,736 A | 6/1976 | Free et al. ............. 252/8.55 R |
| 3,998,272 A | 12/1976 | Maly |
| 4,126,423 A | 11/1978 | Kongsgaarden .......... 23/293 R |
| 4,126,424 A | 11/1978 | Kongsgaarden .......... 23/293 R |
| 4,169,798 A | 10/1979 | DeMartino ............ 252/8.55 R |
| 4,202,795 A | 5/1980 | Burnham et al. ........... 252/332 |
| 4,234,344 A | 11/1980 | Tinsley et al. ................ 106/88 |
| 4,261,421 A | 4/1981 | Watanabe |
| 4,384,896 A | 5/1983 | Aitcin et al. ............. 106/288 B |
| 4,385,935 A | 5/1983 | Skjeldal ........................ 106/98 |
| 4,387,769 A | 6/1983 | Erbstoesser et al. ........ 166/295 |
| 4,470,915 A | 9/1984 | Conway ................ 252/8.55 R |
| 4,506,734 A | 3/1985 | Nolte .......................... 166/308 |
| 4,526,695 A | 7/1985 | Erbstoesser et al. ... 252/8.55 R |
| 4,715,967 A | 12/1987 | Bellis et al. ............. 252/8.551 |
| 4,716,964 A | 1/1988 | Erbstoesser et al. ........ 166/284 |
| 4,741,401 A | 5/1988 | Walles et al. ............... 166/300 |
| 4,761,183 A | 8/1988 | Clarke ......................... 106/117 |
| 4,770,796 A | 9/1988 | Jacobs .................... 252/8.553 |
| 4,809,783 A | 3/1989 | Hollenbeck et al. ........ 166/307 |
| 4,817,721 A | 4/1989 | Pober ......................... 166/295 |
| 4,843,118 A | 6/1989 | Lai et al. .................... 524/555 |
| 4,848,467 A | 7/1989 | Cantu et al. ................ 166/281 |
| 4,931,098 A | 6/1990 | Danielssen et al. ........ 106/638 |
| 4,933,031 A | 6/1990 | Blomberg et al. .......... 106/679 |
| 4,935,060 A | 6/1990 | Dingsøoyr ................... 106/719 |
| 4,941,536 A * | 7/1990 | Brothers et al. ............ 166/293 |
| 4,957,165 A | 9/1990 | Cantu et al. ................ 166/295 |
| 4,961,466 A | 10/1990 | Himes et al. ............... 166/250 |
| 4,961,790 A | 10/1990 | Smith et al. ................. 106/823 |
| 4,986,353 A | 1/1991 | Clark et al. ................. 166/279 |
| 4,986,354 A | 1/1991 | Cantu et al. ................ 166/279 |
| 4,986,355 A | 1/1991 | Cadad et al. ................ 166/295 |
| 5,082,056 A | 1/1992 | Tackett, Jr. .................. 166/295 |
| 5,086,850 A | 2/1992 | Harris et al. .................. 175/61 |
| 5,102,558 A | 4/1992 | McDougall et al. ..... 252/8.551 |
| 5,121,795 A | 6/1992 | Ewert et al. ................ 166/292 |
| 5,123,487 A | 6/1992 | Harris et al. ................ 166/277 |
| 5,125,455 A | 6/1992 | Harris et al. ................ 166/292 |
| 5,127,473 A | 7/1992 | Harris et al. ................ 166/277 |
| 5,142,023 A | 8/1992 | Gruber et al. .............. 528/354 |
| 5,158,613 A | 10/1992 | Sargeant et al. ............ 106/737 |
| 5,203,629 A | 4/1993 | Valle et al. .................... 366/2 |
| 5,216,050 A | 6/1993 | Sinclair ....................... 524/108 |
| 5,238,064 A | 8/1993 | Dahl et al. ................... 166/293 |
| 5,247,059 A | 9/1993 | Gruber et al. .............. 528/354 |
| 5,263,542 A * | 11/1993 | Brothers ..................... 166/293 |
| 5,275,652 A | 1/1994 | Dåastol ....................... 106/482 |
| 5,292,512 A | 3/1994 | Schaefer et al. ............ 424/401 |

(Continued)

FOREIGN PATENT DOCUMENTS

EP 0 211 079 2/1987

(Continued)

OTHER PUBLICATIONS

Gokhan Baykal, Paper entitled "Utilization of fly ash by pelletization process: theory, application areas and research results" dated 1999.

(Continued)

*Primary Examiner*—George Suchfield
(74) *Attorney, Agent, or Firm*—Craig W. Roddy; Fletcher Yoder

(57) ABSTRACT

The present invention relates to well bore operations, and more particularly, to contained micro-particles, and methods for using such contained micro-particles in cementing operations. An exemplary method of facilitating the use of micro-particles in a well bore fluid comprises the steps of providing contained micro-particles, and adding the contained micro-particles to the well bore fluid. In an exemplary embodiment, the well bore fluids of the present invention comprise encapsulated micro-particles. In another exemplary embodiment, the well bore fluids of the present invention comprise pelletized micro-particles.

54 Claims, No Drawings

U.S. PATENT DOCUMENTS

| | | | |
|---|---|---|---|
| 5,320,851 A | 6/1994 | de Mars et al. | 424/451 |
| 5,346,012 A | 9/1994 | Heathman et al. | 166/293 |
| 5,359,026 A | 10/1994 | Gruber | 528/354 |
| 5,373,901 A | 12/1994 | Norman et al. | 166/300 |
| 5,437,331 A | 8/1995 | Gupta et al. | 166/300 |
| 5,439,055 A | 8/1995 | Card et al. | 166/280 |
| 5,454,867 A | 10/1995 | Brothers et al. | 106/724 |
| 5,460,226 A | 10/1995 | Lawson et al. | 166/300 |
| 5,472,501 A | 12/1995 | Dåstøl | 106/823 |
| 5,475,080 A | 12/1995 | Gruber et al. | 528/354 |
| 5,484,881 A | 1/1996 | Gruber et al. | 528/354 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,696,059 A | 12/1997 | Onan et al. | 507/269 |
| 5,728,209 A * | 3/1998 | Bury et al. | 106/819 |
| 5,769,939 A | 6/1998 | Dingsøyr et al. | 106/737 |
| 5,783,541 A | 7/1998 | Tack et al. | 510/224 |
| 5,843,216 A | 12/1998 | Dåstøl | 106/819 |
| 5,849,401 A | 12/1998 | El-Afandi et al. | 428/215 |
| 5,911,923 A | 6/1999 | Work et al. | 264/4.7 |
| 5,922,652 A | 7/1999 | Kowalski et al. | 507/129 |
| 6,036,768 A | 3/2000 | Edlinger et al. | 106/714 |
| 6,060,535 A | 5/2000 | Villar et al. | 523/130 |
| 6,131,661 A | 10/2000 | Conner et al. | |
| 6,136,867 A | 10/2000 | Frouin et al. | 516/80 |
| 6,138,759 A | 10/2000 | Chatterji et al. | 166/293 |
| 6,143,698 A | 11/2000 | Murphey et al. | |
| 6,153,562 A | 11/2000 | Villar et al. | 507/269 |
| 6,156,808 A | 12/2000 | Chatterji et al. | 516/116 |
| 6,162,766 A | 12/2000 | Muir et al. | 507/267 |
| 6,189,615 B1 | 2/2001 | Sydansk | 166/270 |
| 6,207,620 B1 | 3/2001 | Gonzalez et al. | 507/277 |
| 6,209,646 B1 | 4/2001 | Reddy et al. | 166/300 |
| 6,225,262 B1 | 5/2001 | Irwin et al. | 507/203 |
| 6,242,390 B1 | 6/2001 | Mitchell et al. | 507/211 |
| 6,258,160 B1 | 7/2001 | Chatterji et al. | 106/705 |
| 6,279,656 B1 | 8/2001 | Sinclair et al. | 166/310 |
| 6,297,202 B1 | 10/2001 | Chatterji et al. | 507/261 |
| 6,323,307 B1 | 11/2001 | Bigg et al. | 528/354 |
| 6,326,458 B1 | 12/2001 | Gruber et al. | 528/354 |
| 6,332,920 B1 | 12/2001 | Noik et al. | |
| 6,357,527 B1 | 3/2002 | Norman et al. | 166/300 |
| 6,380,138 B1 | 4/2002 | Ischy et al. | |
| 6,387,986 B1 | 5/2002 | Moradi-Araghi et al. | 523/211 |
| 6,394,185 B1 | 5/2002 | Constien | 166/296 |
| 6,444,316 B1 | 9/2002 | Reddy et al. | 428/407 |
| 6,457,524 B1 | 10/2002 | Roddy | 166/293 |
| 6,471,975 B1 | 10/2002 | Banovetz et al. | 148/538 |
| 6,485,947 B1 | 11/2002 | Rajgarhia et al. | 435/139 |
| 6,500,253 B1 | 12/2002 | Norman et al. | 106/726 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,565,644 B1 | 5/2003 | Kepler et al. | 106/713 |
| 6,572,262 B1 | 6/2003 | Russel-Smith | 366/348 |
| 6,599,863 B1 | 7/2003 | Palmer et al. | 507/219 |
| 6,610,139 B1 | 8/2003 | Reddy et al. | 106/724 |
| 6,624,130 B1 | 9/2003 | Giblin et al. | 510/130 |
| 6,644,405 B1 | 11/2003 | Vijn et al. | 166/293 |
| 6,645,288 B1 | 11/2003 | Dargaud et al. | 106/696 |
| 6,648,962 B1 | 11/2003 | Berke et al. | 106/696 |
| 6,655,475 B1 | 12/2003 | Wald | 175/64 |
| 6,669,771 B1 | 12/2003 | Tokiwa et al. | 106/162 |
| 6,689,208 B1 | 2/2004 | Brothers | 106/794 |
| 6,702,022 B1 | 3/2004 | Kattsyn et al. | 166/304 |
| 6,702,023 B1 | 3/2004 | Harris et al. | |
| 6,710,019 B1 | 3/2004 | Sawdon et al. | 507/136 |
| 6,722,434 B1 | 4/2004 | Reddy | |
| 6,761,218 B1 | 7/2004 | Nguyen et al. | 166/278 |
| 6,761,220 B1 | 7/2004 | Blauch | |
| 6,763,888 B1 | 7/2004 | Harris et al. | 166/305.1 |
| 6,817,414 B1 | 11/2004 | Lee | |
| 6,874,578 B1 * | 4/2005 | Garnier et al. | 166/293 |
| 6,896,058 B1 | 5/2005 | Munoz, Jr. et al. | |
| 6,911,078 B1 * | 6/2005 | Barlet-Gouedard et al. | 106/692 |
| 6,949,491 B1 | 9/2005 | Cooke, Jr. | |
| 6,992,048 B1 | 1/2006 | Reddy | |
| 7,036,586 B1 | 5/2006 | Roddy | |
| 7,036,587 B1 | 5/2006 | Munoz | |
| 7,063,150 B1 | 6/2006 | Slabaugh | |
| 7,063,151 B1 | 6/2006 | Nguyen | |
| 2001/0016562 A1 | 8/2001 | Muir et al. | 507/201 |
| 2002/0004464 A1 | 1/2002 | Nelson et al. | 507/200 |
| 2002/0036088 A1 | 3/2002 | Todd | |
| 2002/0125012 A1 | 9/2002 | Dawson et al. | 166/300 |
| 2002/0147113 A1 | 10/2002 | Green | 507/104 |
| 2002/0193257 A1 | 12/2002 | Lee at el. | 507/200 |
| 2003/0000423 A1 | 1/2003 | Vijn et al. | 106/676 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0134751 A1 | 7/2003 | Lee et al. | 507/200 |
| 2003/0150615 A1 | 8/2003 | Dao et al. | 166/293 |
| 2003/0177954 A1 | 9/2003 | Vijn et al. | 106/716 |
| 2003/0177955 A1 | 9/2003 | Vijn et al. | 106/724 |
| 2003/0181542 A1 | 9/2003 | Vijn et al. | 523/130 |
| 2003/0234103 A1 | 12/2003 | Lee at el. | 166/293 |
| 2003/0236171 A1 | 12/2003 | Nguyen et al. | 507/100 |
| 2004/0014607 A1 | 1/2004 | Sinclair et al. | 507/200 |
| 2004/0040706 A1 | 3/2004 | Hossaini et al. | 166/278 |
| 2004/0043906 A1 | 3/2004 | Heath et al. | 507/200 |
| 2004/0063588 A1 | 4/2004 | Rose et al. | 507/103 |
| 2004/0094300 A1 | 5/2004 | Sullivan et al. | |
| 2004/0107875 A1 * | 6/2004 | Drochon et al. | 106/714 |
| 2004/0110645 A1 | 6/2004 | Campbell | 507/200 |
| 2004/0138068 A1 | 7/2004 | Rimmer et al. | 507/100 |
| 2004/0152601 A1 | 8/2004 | Still et al. | 507/100 |
| 2004/0231845 A1 | 11/2004 | Cooke, Jr. | 166/279 |
| 2004/0261993 A1 | 12/2004 | Nguygen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0103496 A1 | 5/2005 | Todd et al. | |
| 2005/0167104 A1 | 8/2005 | Roddy | |
| 2005/0191346 A1 | 9/2005 | Nowak | |
| 2005/0252659 A1 | 11/2005 | Sullivan et al. | |
| 2005/0272613 A1 | 12/2005 | Cooke, Jr. | |

FOREIGN PATENT DOCUMENTS

| | | |
|---|---|---|
| EP | 0 621 247 B1 | 7/1999 |
| EP | 0 879 935 A3 | 10/1999 |
| EP | 0 832 861 B1 | 7/2001 |
| EP | 1 166 866 A2 | 1/2002 |
| EP | 1 348 831 A1 | 10/2003 |
| EP | 1 413 710 A1 | 4/2004 |
| GB | 2 279 942 A | 1/1995 |
| NO | 167649 | 4/2002 |
| RU | 2 196 221 C2 | 1/2003 |
| RU | 2 199 226 C2 | 1/2003 |
| WO | WO 90/11977 | 10/1990 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/3995 | 2/1995 |
| WO | WO 95/09879 | 4/1995 |

| WO | WO 95/15931 | 6/1995 |
| WO | WO 97/11845 | 4/1997 |
| WO | WO 00/49272 | 8/2000 |
| WO | WO 02/12674 | 2/2002 |
| WO | WO 03/027431 A2 | 4/2003 |
| WO | WO 03/027431 A3 | 4/2003 |
| WO | WO 2004/001188 A1 | 12/2003 |
| WO | WO 04/037946 A1 | 5/2004 |
| WO | WO 04/038176 A1 | 5/2004 |
| WO | WO 2004/037946 A1 | 5/2004 |
| WO | WO 2004/038176 A1 | 5/2004 |

OTHER PUBLICATIONS

Foreign communication from a related counterpart application dated Apr. 21, 2005.
Halliburton brochure entitled "Microblock Cement Additive" dated 1999.
Halliburton brochure entitled "MICROSAND Cement Additive" dated 1999.
Halliburton brochure entitled "Perlite Cement Additive" dated 1999.
Halliburton brochure entitled "Silicalite Cement Additive" dated 1999.
Halliburton brochure entitled "Spherelite Cement Additive" dated 1999.
Halliburton brochure entitled "SSA-1 Strength-Stabilizing Agent" dated 1998.
Halliburton brochure entitled "SSA-2 Coarse Silica Flour" dated 1999.
Paper entitled "Poly (phenyllactide) : Synthesis, Characterization, and Hydrolytic Degradation" by Tara L. Simmons et al., dated 2001.
Paper entitled "Synthesis and Properties of Polymers Derived from Substituted Lactic Acids" by Mao Tin et al., dated 2001.
Paper entitled "Macromolecules" by Mao Yin et al. , dated 1999.
Paper entitled "Advanced in Polymer Science" by Professor Akihiro Abe et al. dated 2002, pp. 1-138.
Paper entitled "Force 10,000 Mechanical Properties of Force 10,000® Microsilica Concrete", Grace Construction Products, dated 1999.
Paper entitled "Force 10,000 Water and Gas Permeability of Force 10,000® Microsilica Concrete," Grace Construction Products, dated 1999.
Paper entitled "Force 10,000® D High Performance Concrete Admixture Dry Densified Powder" Grace Construction Products, dated 2002.
Simmons, et al., "Poly(phenyllactide): Synthesis, Characterization, and Hydrolytic Degradation," Biomacromolecules, vol. 2, No. 3, 2001 (pp. 658-663).
Yin, et al., "Preparation and Characterization of Substituted Polylactides," Am. Chem. Soc., vol. 32, No. 23, 1999 (pp. 7711-7718).
Yin, et al., "Synthesis and Properties of Polymers Derived form Substituted Lactic Acids," Am. Chem. Soc., Ch. 12, 2001 (pp. 147-159).
Paper entitled "Controlled Ring-Opening Polymerization of Lactide and Glycolide" by Odile Dechy-Cabaret et al., dated 2004.
Paper entitled "A New Assay for the Enzymatic Degradation of Polylactic Acid" by Virun Vichaibun et al., dated 2003.
U.S. Appl. No. 10/650,101, filed Aug. 26, 2003, Todd et al.
U.S. Appl. No. 10/655,883, filed Sep. 05, 2003, Nguyen .
U.S. Appl. No. 10/661,173, filed Sep. 11, 2003, Todd et al.
U.S. Appl. No. 10/664,126, filed Sep. 17, 2003, Todd et al.
U.S. Appl. No. 10/736,152, filed Dec. 15, 2003, Todd.
U.S. Appl. No. 10/765,334, filed Jan. 27, 2004, Todd et al.
U.S. Appl. No. 10/768,323, filed Jan. 30, 2004, Roddy et al.
U.S. Appl. No. 10/769,490, filed Jan. 30, 2004, Roddy et al.
Skrabal et al., *The Hydrolysis Rate of Orthoformic Acid Ethyl Ether*, Chemical Institute of the University of Graz, pp. 1-38. , Jan. 13, 1921.
Heller, et al., *Poly(ortho esters)*— From Concept To Reality , Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly (ortho ester) s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(*ortho ester*) extruded thin strands, *Journal of Controlled Release* 71, 2001, (pp. 31-37).
Heller, et al., *Poly(ortho ester) s —their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46).
Zignani, et al., *Subconjuctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly(Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).
Todd, Brad et al., "A Chemical 'Trigger'Useful for Oilfield Applications" dated 2005, SPE 92709.
Cordes, E.H. et al., "Mechanism and Catalysis for Hydrolysis of Acetals, Ketals and Ortho Esters" dated 1973.

* cited by examiner

CONTAINED MICRO-PARTICLES FOR USE IN WELL BORE OPERATIONS

BACKGROUND OF THE INVENTION

The present invention relates to well bore operations, and more particularly, to contained micro-particles, and methods for using such contained micro-particles in cementing operations.

Well bore fluids may be used in a subterranean formation in a number of ways. For example, hydraulic cement compositions are commonly utilized in subterranean operations, particularly subterranean well completion and remedial operations. For example, hydraulic cement compositions are used in primary cementing operations whereby pipe strings, such as casings and liners, are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened, substantially impermeable cement that substantially supports and positions the pipe string in the well bore and bonds the exterior surface of the pipe string to the walls of the well bore. Hydraulic cement compositions also are used in remedial cementing operations, such as plugging highly permeable zones or fractures in well bores, plugging cracks and holes in pipe strings, and the like.

Set cement, and particularly the set cement forming the cement sheath in the annulus of high temperature wells (e.g., those where temperatures in the well bore exceed about 230° F.), often fails due to shear and compressional stresses exerted thereon. Generally, the failure is in the form of radial or circumferential cracking of the cement as well as the breakdown of the bond between the cement and the pipe or between the cement and the formation. These failures of the cement sheath are undesirable. To counteract this problem, silica is typically included in the cement composition wherein the silica comprises fine silica flour, silica flour, micro-silica, silica sand, or mixtures thereof. However, the addition of silica to a cement composition may cause handling problems. One method to ease the use of silica in cement compositions comprises using water-silica suspensions to allow for the convenient transfer of silica into a cement composition. However, this method can be problematic because the water-silica suspensions may settle and separate over time. As a result, agitating equipment may be needed during storage of the suspensions to prevent such settling and the formation of hard cake in the bottoms of containers. Moreover, other micro-particles that may be added to a cement composition, such as fine particle-size cement, ultra-fine particle-size cement, fly ash, slag, zeolite, or vitrified shale, may present similar handling problems.

SUMMARY OF THE INVENTION

The present invention relates to well bore operations, and more particularly, to contained micro-particles, and methods for using such contained micro-particles in cementing operations.

In one embodiment, the present invention provides a method of facilitating the use of micro-particles in a well bore fluid comprising the steps of providing contained micro-particles; and adding the contained micro-particles to the well bore fluid.

In another embodiment, the present invention provides a method of facilitating the use of micro-particles in a well bore fluid comprising the steps of providing encapsulated micro-particles; and adding the encapsulated micro-particles to the well bore fluid.

In another embodiment, the present invention provides a method of cementing in a subterranean formation comprising the steps of providing a cement composition, wherein at least one component of the cement composition comprises micro-particles that were added to the cement composition as contained micro-particles; placing the cement composition into the subterranean formation; and allowing the cement composition to set.

In another embodiment, the present invention provides a method of cementing in a subterranean formation comprising the steps of providing a cement composition wherein the cement composition comprises cement and micro-particle silica, wherein at least a portion of the micro-particle silica was added to the cement composition as contained micro-particle silica; placing the cement composition into the subterranean formation; and allowing the cement composition to set.

In another embodiment, the present invention provides a method of providing micro-particle silica for use in cementing operations comprising the steps of providing micro-particle silica, wherein at least a portion of the micro-particle silica is provided as contained micro-particle silica; and placing the contained micro-particle silica into a cement composition.

In another embodiment, the present invention provides a method of cementing in a subterranean formation comprising the steps of providing a cement composition wherein the cement composition comprises cement and crystalline micro-particle silica, wherein at least a portion of the crystalline micro-particle silica was added to the cement composition as contained crystalline micro-particle silica; placing the cement composition into the subterranean formation; and allowing the cement composition to set.

In another embodiment, the present invention provides a well bore fluid comprising encapsulated micro-particles.

In another embodiment, the present invention provides a well bore fluid comprising pelletized micro-particles.

In another embodiment, the present invention provides a cement composition comprising cement, water, and micro-particle silica, wherein at least a portion of the micro-particle silica is added to the cement composition as contained micro-particle silica.

In another embodiment, the present invention provides a cement composition comprising micro-particle silica, wherein at least a portion of the micro-particle silica is provided as encapsulated micro-particle silica.

In another embodiment, the present invention provides a cement composition comprising micro-particle silica, wherein at least a portion of the micro-particle silica is provided as pelletized micro-particle silica.

In another embodiment, the present invention provides a cement composition comprising cement and crystalline micro-particle silica, wherein at least a portion of the crystalline micro-particle silica is added to the cement composition as contained crystalline micro-particle silica.

The features and advantages of the present invention will be readily apparent to those skilled in the art upon a reading of the description of the exemplary embodiments which follows.

DESCRIPTION OF EXEMPLARY EMBODIMENTS

The present invention relates to well bore operations, and more particularly, to contained micro-particles, and methods for using such contained micro-particles in cementing operations.

The present invention provides contained micro-particles that facilitate the use of micro-particles in well bore fluids. As used herein, contained micro-particles refers to micro-particles that have been in some way converted to, or contained in, a substantially solid form, inter alia, that does not present potentially problematic transport and that is capable of releasing the micro-particles into a well bore fluid at a desired time.

The compositions and methods of the present invention may be suitable for use with any component of a well bore fluid that may be provided in micro-particle form. Examples of such components include, but are not limited to, micro-silica, silica flour, fine silica flour, silica sand, fine particle-size cement, ultra-fine particle-size cement, fly ash, slag, zeolite, and vitrified shale. Generally, such micro-particles may have an average particle-size distribution in the range of less than about 500 microns in diameter. For example, micro-silica generally has an average particle-size distribution of less than about 10 microns in diameter. An example of a suitable micro-silica is "SILICALITE" cement additive, which is commercially available from Halliburton Energy Services, Duncan, Okla. Micro-silica may comprise amorphous silica dust that is, e.g., collected from the off-gases of electrothermal smelting furnaces that produce silicon or ferrosilicon. Silica flour may comprise crystalline micro-particle silica that generally has an average particle-size distribution in the range of from about 20 to about 40 microns in diameter. Fine silica flour may comprise crystalline micro-particle silica that usually has an average particle-size distribution of less than about 20 microns in diameter. Examples of suitable silica flours are "SSA-1" and "SSA-2" strength stabilizing agents, which are commercially available from Halliburton Energy Services, Duncan, Okla. Silica sand also may comprise crystalline micro-particle silica that has an average particle-size distribution in the range of from about 80 to about 500 microns in diameter. An example of a suitable ground high-purity crystalline micro-particle silica is "MICROSAND" cement additive, which is commercially available from Halliburton Energy Services, Duncan, Okla. Ultra-fine particle-size cement generally comprises any cement that has an average particle-size distribution of less than about 30 microns in diameter. Suitable examples are described in U.S. Pat. Nos. 5,086,850; 5,121,795; 5,123,487; 5,125,455; 5,127,473; and 5,238,064, the relevant disclosures of which are incorporated herein by reference. An example of a suitable ultra-fine particle-size cement is "MICRO MATRIX®" cement, which is commercially available from Halliburton Energy Services, Duncan, Okla. Additional cementitious materials of particle size and fineness as set out above are disclosed in U.S. Pat. No. 4,761,183, which is drawn to slag, and mixtures thereof with Portland cement, the relevant disclosure of which is incorporated herein by reference. Fly ash typically comprises spherical particles of alumino-silicate glass that may be a by-product from the combustion of coal in power plants. Fly ash may be provided in micro-particle form. Relatively small particle fly ash is commercially available as a 50:50 blend with ultra-fine particle-size cement under the trade name "MICRO FLY ASH" from Halliburton Energy Services, Duncan, Okla.

Numerous methods of containment of the micro-particles are suitable for use in the present invention. Generally, any method of containment, where the micro-particles are converted to, or contained in, a substantially solid form that, among other things, releases the micro-particles into the well bore fluid (e.g., cement composition) at a desired time, is suitable for use with the present invention. Suitable methods of containment include, but are not limited to, pelletization and encapsulation of the micro-particles. In an exemplary embodiment, the contained micro-particles may comprise pelletized micro-particles that degrade to release the micro-particles when added to a well bore fluid. As used herein, pelletized micro-particles reference micro-particles provided in any form of non-particulate solids. In another exemplary embodiment, the contained micro-particles of the present invention may comprise encapsulated micro-particles. As used herein, encapsulated micro-particles reference micro-particles that are enclosed within an outer coating so as to contain the micro-particles.

For the pelletized embodiments of the present invention, the pelletized micro-particles may be produced by any method of pelletization that is suitable for the type of micro-particles used and suitable to release the micro-particles when added to a well bore fluid (e.g., cement composition) so that the micro-particles can become integrated in the well bore fluid. Generally, the pelletized micro-particles may be formed into pellets of any desired shape and/or size by any method of pelletization, including, but not limited to, compression, extrusion, and casting. One suitable method of pelletization is disclosed in U.S. Pat. No. 4,126,423, where the density of micro-silica is increased by tumbling the micro-silica in an enclosed drum to produce uniform spherical balls of about 0.5 mm in diameter. Another suitable method of pelletization is disclosed in U.S. Pat. No. 3,832,434, which discloses a method for the pelletization of micro-silica where an aqueous medium is added to the micro-silica to form a liquid suspension; adding micro-silica to said suspension under strong agitation to form a thixotropic paste; and continuing agitation until solid nodules are formed. One of ordinary skill in the art, with the benefit of this disclosure, will recognize other appropriate methods of pelletization that may be used in conjunction with the compositions and methods of the present invention.

When used in conjunction with a well bore fluid (e.g., cement composition), generally, the pelletized micro-particles should become incorporated in the well bore fluid at a desired time after combination with the well bore fluid. For instance, the contained micro-particles can be designed so as to become immediately integrated into the well bore fluid upon combination, or they may be designed to become incorporated after a chosen delay period. In an exemplary embodiment, the pelletized micro-particles degrade to release the micro-particles into the well bore fluid during its preparation and prior to the placement of the well bore fluid into the subterranean formation. In another embodiment, the pelletized micro-particles degrade to release the micro-particles into the well bore fluid after the placement of the well bore fluid into the subterranean formation.

For the encapsulated embodiments of the present invention, any method of encapsulation that is suitable for the type of micro-particles used and where the encapsulated micro-particles may be released at a desired time into a well bore fluid (e.g., cement composition), is suitable for use with the present invention. In an exemplary embodiment, the encapsulated micro-particles comprise at least one coating of a degradable material.

It is understood that when degradable materials are used as a coating, such degradable materials are capable of undergoing an irreversible degradation. The term "irreversible" as used herein means that the degradable material, once degraded, should not recrystallize or reconsolidate. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

Generally, the coating should degrade at a desired time so that the micro-particles may become incorporated into the well bore fluid (e.g., cement composition). In some embodiments, the coating should degrade during preparation of the well bore fluid and prior to its placement into the subterranean formation so that the micro-particles may become incorporated into the well bore fluid before the well bore fluid is placed into the subterranean formation. In other embodiments, the coating should degrade to release the micro-particles after a desired delay period, e.g., after the well bore fluid is placed into the subterranean formation.

In an exemplary embodiment, the degradable material comprises a degradable polymeric material. One should be mindful that the degradability of a polymer depends at least in part on its backbone structure. The physical properties of degradable polymeric materials depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the coating utilized can be further tailored by blending, and copolymerizing it with another polymer, or by a change in the macromolecular architecture (e.g., hyper-branched polymers, star-shaped, or dendrimers, etc.). The properties of any such suitable degradable polymeric materials (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate degradable polymeric material to achieve the desired physical properties of the coating.

Suitable examples of degradable materials that may be used in accordance with the present invention include, but are not limited to, those described in the publication of *Advances in Polymer Science*, Vol. 157, entitled "Degradable Aliphatic Polyesters" edited by A.-C. Albertsson, pages 1–138. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable degradable materials include polysaccharides, such as dextrans or celluloses; chitins; chitosans; liquid esters (e.g., triethyl citrate); proteins (e.g., gelatin); aliphatic polyesters; poly(lactides); poly(glycolides); poly($\epsilon$-caprolactones); poly(hydroxybutyrates); poly(anhydrides); aliphatic polycarbonates; ortho esters, poly(orthoesters); poly(amino acids); poly(ethylene oxides); and polyphosphazenes.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Also, in some embodiments, it is desirable for the degradable material to degrade slowly over time as opposed to instantaneously.

Further, the encapsulation of the micro-particles within the coating may be accomplished by any suitable encapsulation method. Exemplary methodology is described in U.S. Pat. Nos. 5,373,901; 6,444,316; 6,527,051; and 6,554,071, the relevant disclosures of which are incorporated herein by reference. An additional encapsulation method comprises wrapping a predetermined quantity of micro-particles in a degradable coating to form encapsulated micro-particles. For example, the coating may comprise a water-dissolvable material that contains a predetermined quantity of micro-particles. Exemplary water-dissolvable materials are described in U.S. Pat. Nos. 4,961,790 and 5,783,541, the relevant disclosures of which are incorporated herein by reference. The amount of micro-particles wrapped in the coating may vary, inter alia, based on a number of factors such as the desired size of the encapsulated micro-particles and the amount or concentration of micro-particles desired in the cement composition. One of ordinary skill in the art, with the benefit of this disclosure, will recognize other appropriate methods of encapsulation that may be used in conjunction with the methods of the present invention.

In alternative embodiments of the present invention, the above-mentioned methods of containment may be combined. For example, a contained micro-particle may comprise a pelletized micro-particle that has been encapsulated resulting in an encapsulated pelletized micro-particle. Also, a portion of pelletized micro-particles may be used in conjunction with a portion of encapsulated micro-particles. One of ordinary skill in the art, with the benefit of this disclosure, will recognize the appropriate method of containment for a chosen application.

An exemplary embodiment of a cement composition of the present invention comprises cement, water, and optional additives, wherein at least one component of the cement composition comprises micro-particles that were added to the cement composition as contained micro-particles. Typically, the cement compositions of the present invention have a density in the range of from about 4 lb/gallon to about 20 lb/gallon. In certain exemplary embodiments, the cement compositions of the present invention have a density in the range of from about 8 lb/gallon to about 17 lb/gallon. It is understood that the cement compositions of the present invention may be foamed or unfoamed or may comprise other means to reduce their densities. One of ordinary skill in the art, with the benefit of this disclosure, will recognize the appropriate density of the cement composition for a chosen application.

Any cements suitable for use in subterranean applications are suitable for use in the present invention. In one embodiment, the improved cement compositions of the present invention comprise a hydraulic cement. A variety of hydraulic cements are suitable for use, including those comprised of calcium, aluminum, silicon, oxygen, and/or sulfur, which set and harden by reaction with water. Such hydraulic cements include, but are not limited to, Portland cements, pozzoloanic cements, gypsum cements, soil cements, calcium phosphate cements, high-alumina content cements, silica cements, high-alkalinity cements, or mixtures thereof. In an exemplary embodiment, at least a portion of the cement comprises micro-particles that were added to the cement composition as contained cement micro-particles. Examples of cements in micro-particle form include, but are not limited to, ultra-fine particle-size cement. As described above, the cement micro-particles may be contained by any method of containment where the cement micro-particles are converted to, or contained in, a form, inter alia, that releases the cement micro-particles into the cement composition at a desired time. For example, the cement micro-particles may be contained by pelletization or encapsulation, as described above. In an exemplary embodiment, the pelletized cement micro-particles may be encapsulated. In another exemplary embodiment, a blend may be used that comprises a portion of pelletized cement micro-particles and a portion of encapsulated cement micro-particles. In an exemplary embodiment, the contained cement micro-particles degrade to release the cement micro-particles during preparation of the cement composition and prior to its placement into the subterranean formation. In another embodiment, the contained cement micro-particles degrade to release the cement micro-particles into the cement composition after the cement composition's placement into the subterranean formation. One of ordinary skill in the art, with the benefit of this disclosure, will recognize the appropriate methods to contain the cement micro-particles for a chosen application.

The water utilized in the cement compositions of the present invention can be fresh water, salt water (e.g., water containing one or more salts dissolved therein), brine (e.g., saturated salt water), or seawater. Generally, the water can be from any source, provided that it does not contain an excess of compounds, e.g., dissolved organics, that may adversely affect other components in the cement composition. The water may be present in an amount sufficient to form a pumpable slurry. In certain exemplary embodiments, the water is present in the cement compositions of the present invention in an amount in the range of from about 30% to about 180% by weight of the cement ("bwoc").

An optional additive that may be included in the cement compositions of the present invention may be micro-particle silica, wherein at least a portion of the micro-particle silica may be added to the cement composition as contained micro-particle silica as described herein. The micro-particle silica used in the cement compositions of the present invention may be any type of micro-particle silica that is suitable for use in subterranean cementing operations. Examples of suitable types of micro-particle silica include, but are not limited to, micro-silica, silica flour, fine silica flour, silica sand, or mixtures thereof. In an exemplary embodiment, the micro-particle silica comprises crystalline micro-particle silica, such as silica flour, fine silica flour, silica sand, or mixtures thereof. Generally, the micro-particle silica is present in the cement compositions of the present invention in an amount sufficient to provide the desired level of protection against potential cement sheath failure. In an exemplary embodiment, the micro-particle silica is present in the cement compositions of the present invention in an amount in the range of from about 25% to about 45% bwoc. One of ordinary skill in the art, with the benefit of this disclosure, will recognize the appropriate amount of micro-particle silica for a chosen application.

According to the present invention, at least a portion of the micro-particle silica, especially if it is micro-silica, silica flour, fine silica flour, or silica sand, may be added to the cement composition as contained micro-particle silica. As described above for contained micro-particles, the contained micro-particle silica may be contained by any method of containment, so that the micro-particle silica is converted to, or contained in, a substantially solid form, inter alia, that does not present potential handling problems and that releases the micro-particle silica into a cement composition or well bore fluid at a desired time. For example, the micro-particle silica may be contained by pelletization or encapsulation, as previously discussed. In an exemplary embodiment, the pelletized micro-particle silica may be encapsulated. In another exemplary embodiment, a blend may be used that comprises a portion of pelletized micro-particle silica and a portion of encapsulated micro-particle silica. In an exemplary embodiment, the contained micro-particle silica degrades to release the micro-particle silica during preparation of the cement composition and prior to its placement into the subterranean formation. In another embodiment, the contained micro-particle silica degrades to release the micro-particle silica into the cement composition after a desired delay period, e.g., after the cement composition's placement into the subterranean formation. One of ordinary skill in the art, with the benefit of this disclosure, will recognize the appropriate format of contained micro-particle silica suitable for use in a chosen application.

Additional optional additives may be added to the cement compositions of the present invention as deemed appropriate by one skilled in the art, wherein at least a portion of such optional additives may added to the cement composition as contained micro-particles. Examples of such optional additives that may be added as contained micro-particles include, but are not limited to, fly ash, slag, zeolite, and vitrified shale. As described above, the contained micro-particles may be contained by any method of containment, where the micro-particles are converted to, or contained in, a substantially solid form, inter alia, that does not present potential handling problems and that releases the micro-particles into the cement composition at a desired time. For example, the micro-particles may be contained by the aforementioned methods of pelletization and encapsulation. In an exemplary embodiment, the pelletized micro-particles may be encapsulated. In another exemplary embodiment, a blend may be used that comprises a portion of pelletized micro-particles and a portion of encapsulated micro-particles. In an exemplary embodiment, the contained micro-particles degrade to release the micro-particles during preparation of the cement composition and prior to its placement into the subterranean formation. In another embodiment, the contained micro-particles degrade to release the micro-particles into the cement composition after the cement composition's placement into the subterranean formation. One of ordinary skill in the art, with the benefit of this disclosure, will recognize the appropriate methods to contain the micro-particles for a chosen application.

Furthermore, additional additives may be added to the cement compositions of the present invention as deemed appropriate by one skilled in the art. Examples of such additives include, inter alia, fluid loss control additives, surfactants, dispersants, accelerators, retarders, salts, micas, fibers, formation-conditioning agents, defoamers, expanding additives, lightweight additives, and the like.

While a number of exemplary embodiments herein relate to cement compositions, it will be understood that any well bore fluid, such as drilling fluids, completion and stimulation fluids, including, but not limited to, drilling muds, well cleanup fluids, workover fluids, spacer fluids, gravel pack fluids, acidizing fluids, fracturing fluids, and the like, may be prepared using the compositions and methods of the present invention wherein such fluids comprise micro-particles.

In an exemplary embodiment, the well bore fluids of the present invention comprise encapsulated micro-particles. In another exemplary embodiment, the well bore fluids of the present invention comprise pelletized micro-particles.

In an exemplary embodiment, the cement compositions of the present invention comprise cement and micro-particle silica, wherein at least a portion of the micro-particle silica is added to the cement composition as contained micro-particle silica. In another exemplary embodiment, the cement compositions of the present invention comprise micro-particle silica, wherein at least a portion of the micro-particle silica is provided as encapsulated micro-particle silica. In another exemplary embodiment, the cement compositions of the present invention comprise micro-particle silica, wherein at least a portion of the micro-particle silica is provided as pelletized micro-particle silica. In another exemplary embodiment, the cement compositions of the present invention comprise cement and crystalline micro-particle silica, wherein at least a portion of the crystalline micro-particle silica is added to the cement composition as contained crystalline micro-particle silica.

An exemplary method of the present invention of facilitating the use of micro-particles in a well bore fluid comprises the steps of providing contained micro-particles; and adding the contained micro-particles to the well bore fluid.

Another exemplary method of the present invention of facilitating the use of micro-particles in a well bore fluid comprises the steps of providing encapsulated micro-particles; and adding the encapsulated micro-particles to the well bore fluid.

An exemplary method of the present invention of cementing in a subterranean formation comprises the steps of providing a cement composition, wherein at least one component of the cement composition comprises micro-particles that were added to the cement composition as contained micro-particles; placing the cement composition into the subterranean formation; and allowing the cement composition to set.

Another exemplary method of the present invention of cementing in a subterranean formation comprises the steps of providing a cement composition wherein the cement composition comprises cement and micro-particle silica, wherein at least a portion of the micro-particle silica was added to the cement composition as contained micro-particle silica; placing the cement composition into the subterranean formation; and allowing the cement composition to set.

Another exemplary method of the present invention of cementing in a subterranean formation comprises the steps of providing a cement composition wherein the cement composition comprises cement and crystalline micro-particle silica, wherein at least a portion of the crystalline micro-particle silica was added to the cement composition as contained crystalline micro-particle silica; placing the cement composition into the subterranean formation; and allowing the cement composition to set.

An exemplary method of the present invention of providing micro-particle silica for use in cementing operations comprises the steps of providing micro-particle silica, wherein at least a portion of the micro-particle silica is provided as contained micro-particle silica; and placing the contained micro-particle silica into a cement composition.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims

What is claimed is:

1. A method of cementing in a subterranean formation comprising the steps of:
    providing a cement composition, wherein at least one component of the cement composition comprises micro-particles that were added to the cement composition as encapsulated micro-particles;
    placing the cement composition into the subterranean formation; and
    allowing the cement composition to set.

2. The method of claim 1 wherein the micro-particles comprise a material selected from the group consisting of micro-silica, silica flour, fine silica flour, silica sand, fine particle-size cement, ultra-fine particle-size cement, fly ash, slag, zeolite, vitrified shale, and combinations thereof.

3. The method of claim 1 wherein the micro-particles have an average particle-size distribution of less than about 500 microns in diameter.

4. The method of claim 1 wherein at least a portion of the micro-particles were added to the cement composition as pelletized micro-particles.

5. The method of claim 4 wherein the pelletized micro-particles are formed into pellets by compression, extrusion, or casting.

6. The method of claim 1 wherein the encapsulated micro-particles comprise at least one coating of a degradable material.

7. The method of claim 6 wherein the degradable material comprises a degradable polymeric material.

8. The method of claim 6 wherein the degradable material comprises a material selected from the group consisting of dextran; cellulose; a chitin; a chitosan; a liquid ester; a protein; an aliphatic polyester; a poly(lactide); a poly(glycolide); a poly($\epsilon$-caprolactone); a poly(hydroxybutyrate); a poly(anhydride); an aliphatic polycarbonate; an ortho ester; a poly(orthoesters); a poly(amino acid); a poly(ethylene oxide); a polyphosphazene; and combinations thereof.

9. The method of claim 6 wherein the coating is applied to the micro-particles by wrapping a predetermined quantity of the micro-particles in the coating.

10. A method of cementing in a subterranean formation comprising the steps of:
    providing a cement composition wherein the cement composition comprises:
        cement and micro-particle silica, wherein at least a portion of the micro-particle silica was added to the cement composition as encapsulated micro-particle silica;
    placing the cement composition into the subterranean formation; and
    allowing the cement composition to set.

11. The method of claim 10 wherein the cement composition further comprises water.

12. The method of claim 10 wherein the micro-particle silica is present in the cement composition in an amount in the range of from about 25% to about 45% by weight of the cement.

13. The method of claim 10 wherein the micro-particle silica comprises a material selected from the group consisting of silica flour, fine silica flour, silica sand, micro-silica, and mixtures thereof.

14. The method of claim 10 wherein the micro-particle silica has an average particle-size distribution of less than about 500 microns in diameter.

15. The method of claim 10 wherein the encapsulated micro-particle silica degrades to release the micro-particle silica into the cement composition.

16. The method of claim 15 wherein the degradation of the encapsulated micro-particle silica occurs prior to the placement of the cement composition into the subterranean formation.

17. The method of claim 10 wherein at least a portion of the micro-particle silica was added to the cement composition as pelletized micro-particle silica.

18. The method of claim 17 wherein the pelletized micro-particle silica is formed into pellets by compression, extrusion, or casting.

19. The method of claim 10 wherein the encapsulated micro-particle silica comprises at least one coating of a degradable material.

20. The method of claim 19 wherein the degradable material comprises a degradable polymeric material.

21. The method of claim 19 wherein the degradable material comprises a material selected from the group consisting of dextran; cellulose; a chitin; a chitosan; a liquid ester; a protein; an aliphatic polyester; a poly(lactide); a poly(glycolide); a poly($\epsilon$-caprolactone); a poly(hydroxybutyrate); a poly(anhydride); an aliphatic polycarbonate; an ortho ester; a poly(orthoester); a poly(amino acid); a poly(ethylene oxide); a polyphosphazene; and combinations thereof.

22. The method of claim 19 wherein the coating is applied to the micro-particles by wrapping a predetermined quantity of the micro-particles in the coating.

23. A method of cementing in a subterranean formation comprising the steps of:
providing a cement composition wherein the cement composition comprises:
cement and crystalline micro-particle silica, wherein at least a portion of the crystalline micro-particle silica was added to the cement composition as encapsulated crystalline micro-particle silica;
placing the cement composition into the subterranean formation; and
allowing the cement composition to set.

24. The method of claim 23 wherein the cement composition further comprises water.

25. The method of claim 23 wherein the crystalline micro-particle silica comprises a material selected from the group consisting of silica flour, fine silica flour, silica sand, and mixtures thereof.

26. The method of claim 23 wherein the crystalline micro-particle silica has an average particle-size distribution of less than about 500 microns in diameter.

27. The method of claim 23 wherein at least a portion of the micro-particle silica was added to the cement composition as pelletized crystalline micro-particle silica.

28. The method of claim 27 wherein the pelletized crystalline micro-particle silica is formed into pellets by compression, extrusion, or casting.

29. The method of claim 23 wherein the encapsulated crystalline micro- particle silica comprises at least one coating of a degradable material.

30. The method of claim 29 wherein the degradable material comprises a degradable polymeric material.

31. The method of claim 29 wherein the degradable material comprises a material selected from the group consisting of dextran; cellulose; a chitin; a chitosan; a liquid ester; a protein; an aliphatic polyester; a poly(lactide); a poly(glycolide); a poly($\epsilon$-caprolactone); a poly(hydroxybutyrate); a poly(anhydride); an aliphatic polycarbonate; an ortho ester; a poly(orthoester); a poly(amino acid); a poly(ethylene oxide); a polyphosphazene: and combinations thereof.

32. The method of claim 29 wherein the coating is applied to the micro-particles by wrapping a predetermined quantity of the micro-particles in the coating.

33. A method of cementing in a subterranean formation comprising:
providing a cement composition, wherein at least one component of the cement composition comprises encapsulated micro-particles;
placing the cement composition into the subterranean formation; and
allowing the cement composition to set.

34. The method of claim 33 wherein the micro-particles comprise a material selected from the group consisting of micro-silica, silica flour, fine silica flour, silica sand, fine particle-size cement, ultra-fine particle-size cement, fly ash, slag, zeolite, vitrified shale, and combinations thereof.

35. The method of claim 33 wherein the micro-particles have an average particle-size distribution of less than about 500 microns in diameter.

36. The method of claim 33 wherein the encapsulated micro-particles comprise at least one coating of a degradable material.

37. The method of claim 36 wherein the degradable material comprises a degradable polymeric material.

38. The method of claim 36 wherein the degradable material comprises a material selected from the group consisting of dextran; cellulose; a chitin; a chitosan; a liquid ester; a protein; an aliphatic polyester; a poly(lactide); a poly(glycolide); a poly($\epsilon$-caprolactone); a poly(hydroxybutyrate); a poly(anhydride); an aliphatic polycarbonate; an ortho ester; a poly(orthoester); a poly(amino acid); a poly(ethylene oxide); a polyphosphazene; and combinations thereof.

39. The method of claim 36 wherein the coating is applied to the micro- particles by wrapping a predetermined quantity of the micro-particles in the coating.

40. The method of claim 36 wherein the degradable material comprises a water-dissolvable material.

41. The method of claim 36 wherein the degradable material comprises an aliphatic polyester.

42. The method of claim 36 wherein the degradable material comprises a poly(lactide).

43. The method of claim 33 wherein the micro-particles have an average particle-size distribution of less than about 10 microns in diameter.

44. The method of claim 33 wherein the micro-particles have an average particle-size distribution of less than about 20 microns in diameter.

45. The method of claim 33 wherein the micro-particles have an average particle size distribution of less than about 30 microns in diameter.

46. The method of claim 33 wherein the micro-particles have an average particle size distribution in the range of from about 20 microns to about 40 microns in diameter.

47. The method of claim 33 wherein the micro-particles have an average particle size distribution in the range of from about 80 microns to about 500 microns in diameter.

48. The method of claim 33 wherein the encapsulated micro-particles comprise encapsulated micro-particle silica.

49. The method of claim 48 wherein the cement composition comprises water and a cement, and wherein the encapsulated micro-particle silica is present in the cement composition in an amount in the range of from about 25% to about 45% by weight of the cement.

50. The method of claim 33 wherein the encapsulated micro-particles comprise encapsulated micro-particle crystalline silica.

51. The method of claim 33 wherein the cement composition comprises pelletized micro-particles.

52. The method of claim 33 wherein the cement composition comprises water and a cement.

53. The method of claim 52 wherein the cement is selected from the group consisting of Portland cement, pozzolanic cement, gypsum cement, soil cement, calcium phosphate cement, high-alumina content cement, silica cement, high-alkalinity cement, and mixtures thereof.

54. The method of claim 33 wherein the cement composition is placed into the annular space between the subterranean formation and a pipe string located in a well bore penetrating the subterranean formation.

* * * * *